United States Patent
Wang et al.

(10) Patent No.: US 9,632,245 B2
(45) Date of Patent: Apr. 25, 2017

(54) BEND-INSENSITIVE MULTIMODE OPTICAL FIBER

(71) Applicant: YANGTZE OPTICAL FIBRE AND CABLE JOINT STOCK LIMITED COMPANY, Wuhan, Hubei (CN)

(72) Inventors: Runhan Wang, Hubei (CN); Dewu Li, Hubei (CN); Rong Huang, Hubei (CN); Gang Chen, Hubei (CN); Gaoqing Lei, Hubei (CN); Ruichun Wang, Hubei (CN); Shengya Long, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 14/930,873

(22) Filed: Nov. 3, 2015

(65) Prior Publication Data
US 2016/0147012 A1 May 26, 2016

(30) Foreign Application Priority Data
Nov. 25, 2014 (CN) .......................... 2014 1 0684893

(51) Int. Cl.
*G02B 6/028* (2006.01)
*G02B 6/036* (2006.01)

(52) U.S. Cl.
CPC .......... *G02B 6/0288* (2013.01); *G02B 6/0365* (2013.01)

(58) Field of Classification Search
None
See application file for complete search history.

(56) References Cited

U.S. PATENT DOCUMENTS

| | | | |
|---|---|---|---|
| 8,145,027 B2* | 3/2012 | Overton | C03C 13/046 385/126 |
| 8,184,936 B2* | 5/2012 | Zhang | G02B 6/0288 385/122 |
| 8,644,664 B2 | 2/2014 | Molin et al. | |
| 8,879,878 B2* | 11/2014 | Bigot-Astruc | G02B 6/0288 385/126 |
| 2016/0147012 A1* | 5/2016 | Wang | G02B 6/0288 385/124 |

* cited by examiner

*Primary Examiner* — Rhonda Peace
(74) *Attorney, Agent, or Firm* — Tim Tingkang Xia, Esq.; Locke Lord LLP (57) ABSTRACT

A bend-insensitive multimode optical fiber includes a core layer, and cladding layers surrounding the core layer. The core layer has a parabolic refractive index profile with α being 1.9-2.2, a radius being 23-27 μm, and a maximum relative refractive index difference being between 0.9-1.2%. The inner cladding layer has a width being 1-3 μm and a relative refractive index difference being between −0.05% and 0.1%. The trench cladding layer has a width being 2-5 μm and a relative refractive index difference being between −1% and −0.3%. The core layer is a Ge/F co-doped silica glass layer, where an F doping contribution at a central position of the core layer is less than or equal to 0%, an F doping contribution at an edge portion of the core layer is greater than or equal to −0.45%. The outer cladding layer is a pure silica glass layer.

15 Claims, 6 Drawing Sheets

BEND-INSENSITIVE MULTIMODE OPTICAL FIBER

CROSS-REFERENCE TO RELATED APPLICATION

This application claims the priority to Chinese Patent Application No. CN201410684893.6, filed Nov. 25, 2014 in the State Intellectual Property Office of P.R. China, which is hereby incorporated herein in its entirety by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates generally to the field of optical communications technologies, and more particularly to a multimode optical fiber having an excellent macrobending performance.

BACKGROUND OF THE INVENTION

Along with the increasing development of science and technology, China has entered an optical fiber broadband and multi-service integrated high-speed developing information era. After integration, the telecommunication network, the TV network and the Internet may bear various infromationization businesses, and can all provide various services such as calling, connecting to the Internet and watching TV for users. This definitely makes greater demands on high bandwidth and flexibility of network infrastructures of data center machine rooms for operators and enterprises, so as to be capable of supporting applications such as high-performance connection, storage area network (SAN), network attached storage (NAS) and high-performance computing (for example, cloud computing). Therefore, in the future, data centers will be dominated by 40 G or even 100 G Ethernets. Especially, in recent years, the concepts such as cloud computing and Internet of Things, and application of VCSEL lasers in multimode optical fiber communications networks make more strict requirements for multimode optical fibers in data centers and central machine rooms, where the optical fiber bandwidth requirement and bend insensitive characteristic of the optical fiber are two most important parameters.

IEEE 802.3ba standard, that is, a 40/100 G Ethernet was approved at Jun. 17, 2010, and the standard supports 150 m multimode optical fiber transmission and 40 km single mode optical fiber transmission at rates of 40 Gb/s and 100 Gb/s. The official release of the standard will certainly accelerate the establishment of 40 G and 100 G Ethernets.

OM3 and OM4 multimode optical fibers are 50 μm-core diameter graded refractive index multimode optical fibers, and have a numerical aperture being 0.200±0.015. The minimum Effective Mode Bandwidth (EMB) of the OM3 and OM4 optical fibers is respectively 2000 MHz·km and 4700 MHz·km. Transmission distances of the OM3/OM4 multimode optical fibers in 10 Gb/s, 40 Gb/s and 100 Gb/s systems are shown in Table 1. It can be seen that, in medium-short distance high-speed network, the multimode optical fibers are well qualified.

TABLE 1

Transmission distances of OM3/OM4 multimode optical fibers in 10 Gb/s, 40 Gb/s and 100 Gb/s systems

|  | 10 GBASE SX (850 nm) | 40 GBASE SR4 (850 nm) | 100 GBASE SR10 (850 nm) |
| --- | --- | --- | --- |
| OM3 | 300 m | 100 m | 100 m |
| OM4 | 550 m | 150 m | 150 m |

Compared with normal OM3/OM4 multimode optical fibers, bend insensitive OM3/OM4 multimode optical fibers have the characteristic of high bandwidth, and further have more excellent macrobending performance, so that they can take more advantages in special deployment conditions such as data centers and central machine rooms; therefore, they gradually become research and development emphasis of various optical fiber and cable manufacturing enterprises, and have the tendency of replacing the normal OM3 and OM4 multimode optical fibers.

An effective method of reducing macro-bending induced loss of an optical fiber is using a design of a trench cladding layer, and when the optical fiber is subjected to small bend, light leaked from a core will be limited in an inner cladding layer in a large proportion and then returned to the core, thereby effectively reducing macro-bending induced losses.

Generally, optimization on an optical fiber with trench-assisted structure generally lies in the structure of the trench cladding layer, that is, the depth and width of the trench cladding layer and a distance from the trench cladding layer to a core layer. To obtain better macro-bending performance, theoretically, greater width and depth of the trench cladding layer can both increase the bend-insensitive performance of the optical fiber, but also inhibits a high-order mode of a multimode optical fiber from leaking to outer-layer pure quartz, thereby affecting the DMD and bandwidth performances of the optical fiber.

Currently, VCSEL light sources of various multimode optical fiber laser manufacturers all have wavelength dispersion of different sizes, and in order to ensure that lasers of different wavelengths of the lasers can transmit synchronously in an optical fiber core layer, considering sensitivities of inner doping of the core layer on transmission rates of lasers with different wavelengths, reasonable doping concentration may be designed to ensure synchronous transmission of a VCSEL light source laser in the optical fiber; especially, when the VCSEL optical fiber performs injection at a central position of the core layer, the central position of the core layer adopts an appropriate Ge/F co-doping manner, thereby effectively optimizing the DMD performance.

Figure 1:
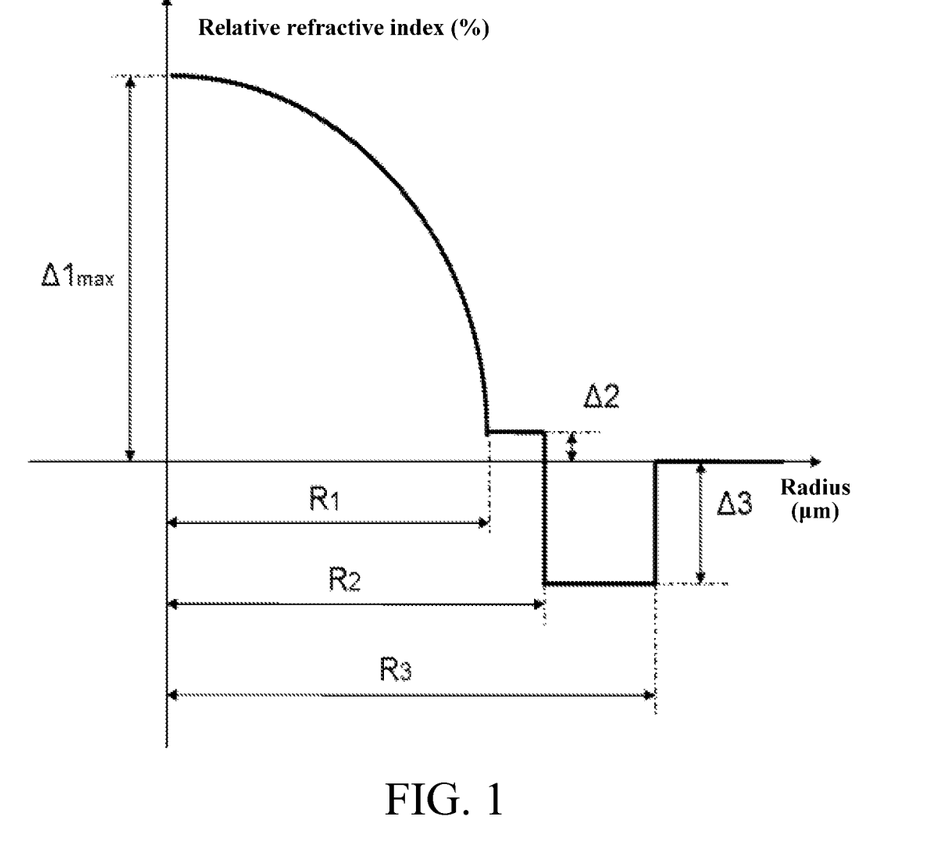
FIG. 1 is a schematic diagram of a refractive index profile of an optical fiber according to one embodiment of the present invention.
Figure 2:
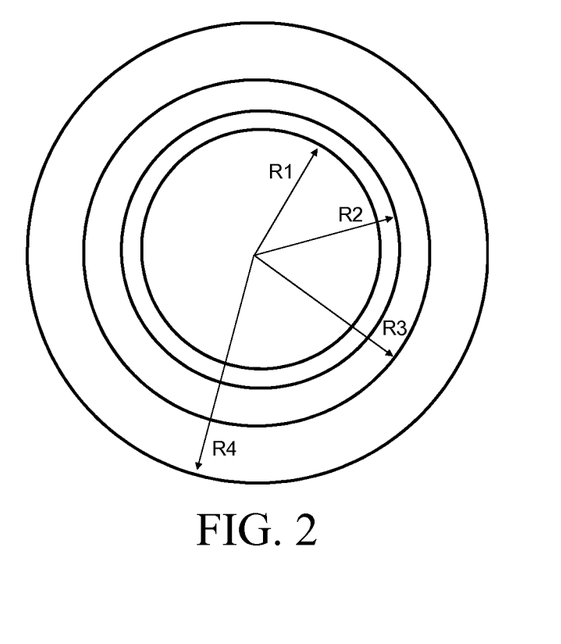
FIG. 2 is a schematic sectional diagram of an optical fiber according to one embodiment of the present invention.
Figure 3:
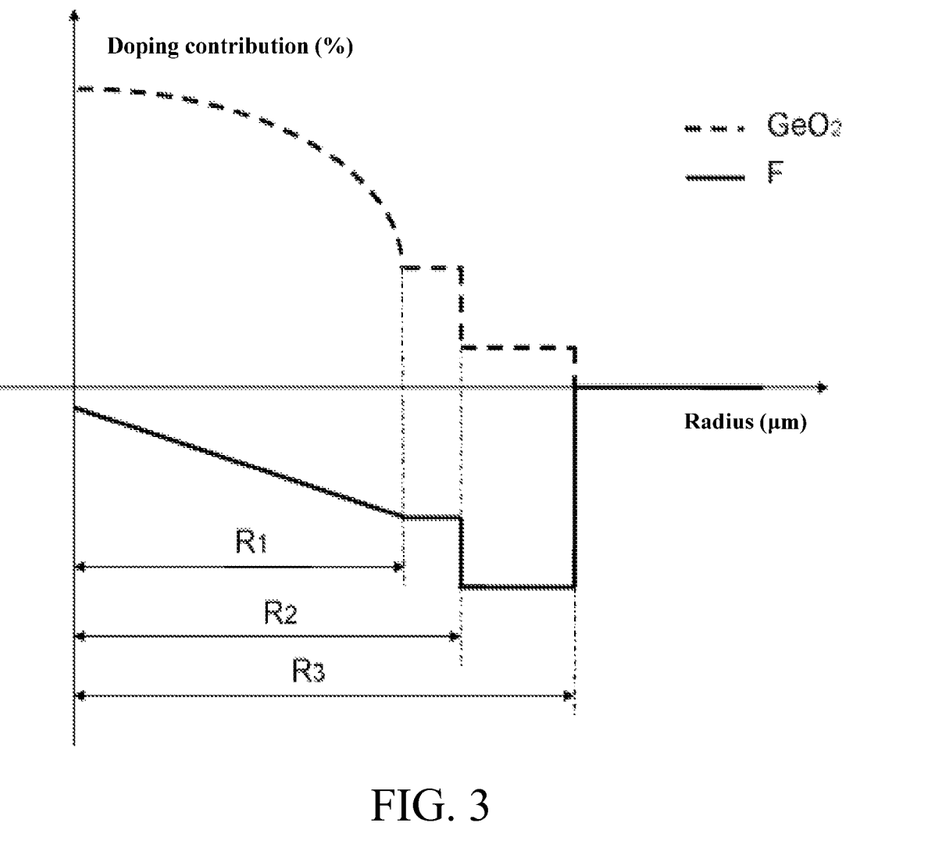
FIG. 3 is a schematic diagram of a Ge/F doping contribution of an optical fiber according to one embodiment of the present invention.
Figure 4:
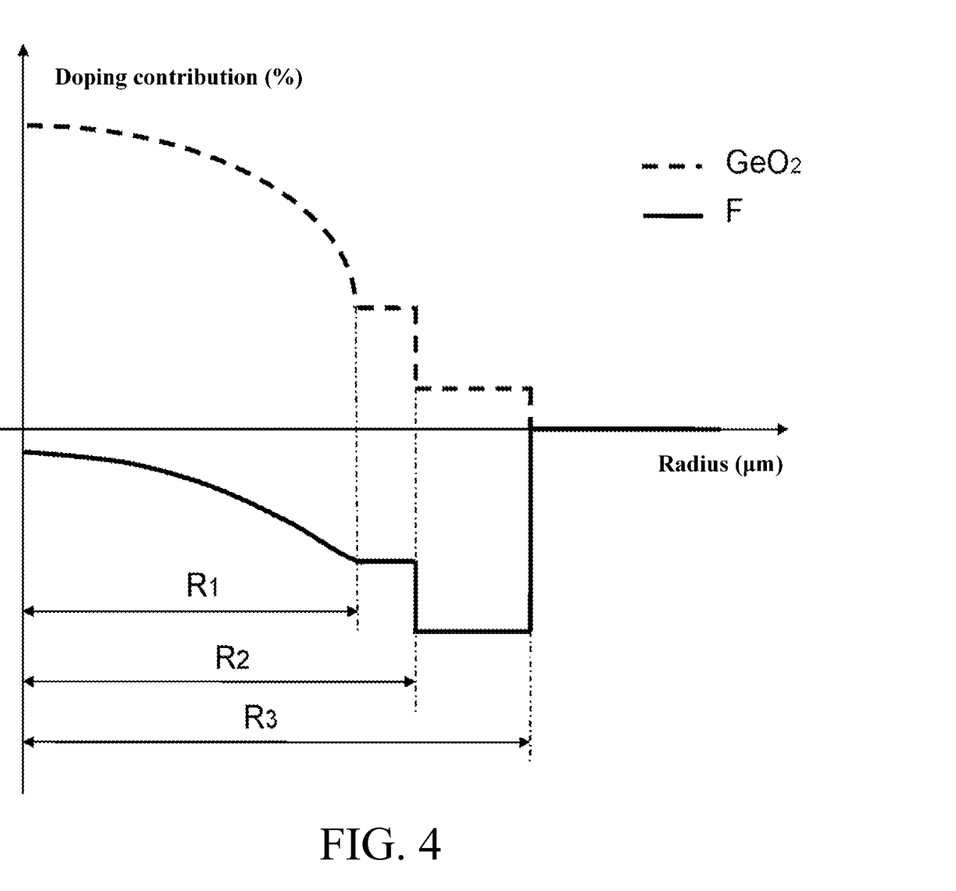
FIG. 4 is a schematic diagram of a Ge/F doping contribution of an optical fiber according to another embodiment of the present invention.
Figure 5:
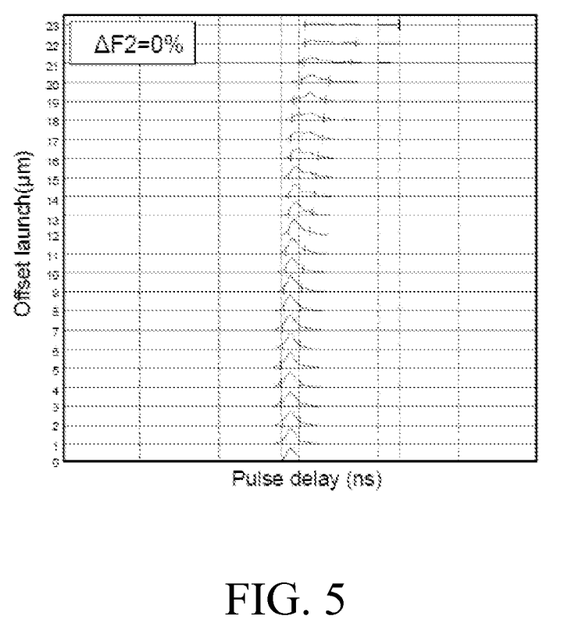
FIG. 5 is a DMD curve of a bend-insensitive multimode optical fiber whose middle cladding layer is not doped with F.
Figure 6:
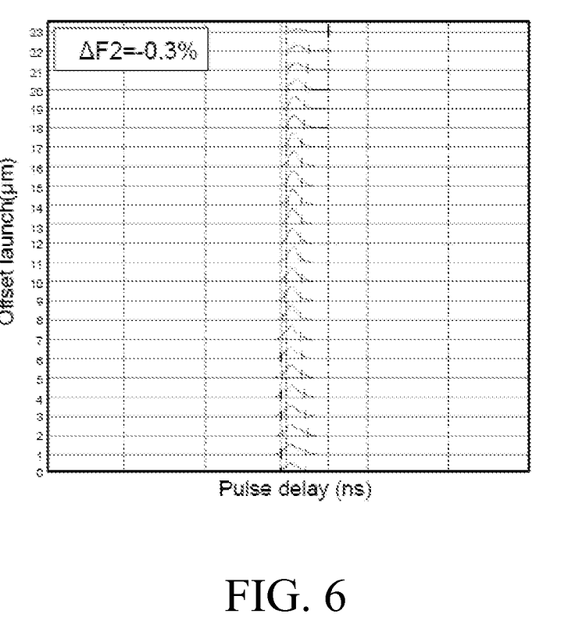
FIG. 6 is a DMD curve of a bend-insensitive multimode optical fiber whose middle cladding layer has an F doping contribution of −0.3%.
Figure 7:
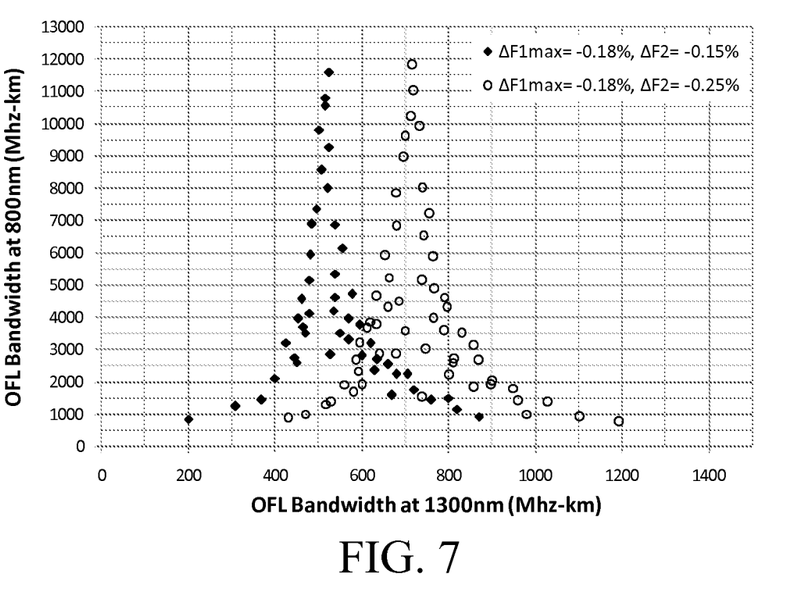
FIG. 7 is a distribution relation diagram of bandwidths of bend-insensitive multimode optical fibers having different F opting contributions at 850 nm and 1300 nm.

Theoretically, to ensure that the multimode optical fiber has desirable DMD and bandwidth performances, accurate control of a core layer refractive index profile of the optical fiber is very important. However, in an actual optical fiber production process, a preform is prepared first, and an optical fiber is then obtained through a drawing process. During fiber forming, glass raw material is inevitably subjected to an external force, so that due to residual stress and component expression, a core layer refractive index profile of the drawn optical fiber will have distortion compared with the original preform. Researches show that, by reasonably designing the viscosity of an inner cladding layer and introducing the design of a functionally graded material, a buffer layer may be formed between the core layer and the recessed layer, to bear a part of the drawing tension, and reduce the influence of the cladding layer interface effect on the core layer. When middle cladding layer of the bend-insensitive multimode optical fiber preform is not doped with F, once it is formed into an optical fiber in a certain drawing tension, a DMD curve graph thereof is generally shown in FIG. 5, that is, shift and widening occur on the core layer at an outer part, which indicates that an outer region of the optical fiber core layer refractive index profile is deformed. When the middle cladding layer is doped with a certain amount of F, under the action of the same drawing tension, a DMD curve graph thereof is shown in FIG. 6, and the distortion of the outer region of the optical fiber core layer refractive index profile is obviously reduced. In a mass production, the appropriate viscosity of the middle cladding layer will keep perfectness of the optical fiber refractive index profile to the maximum extent, thereby improving the yield of target products. However, in the same amount of doped F in the core layer, for different amounts of doped F in the cladding layer, distributions of 850 mm bandwidth and 1300 nm bandwidth are different, as shown in FIG. 7. Therefore, reasonable optical fiber profile structure and composition designed from the perspective of the functionally graded material is conducive to solving the series of problems of deterioration of optical fiber performance parameters caused by differences in structures and components of the core layer and the trench cladding layer in the bend-insensitive multimode optical fiber.

U.S. Pat. No. 8,644,664 describes a bend-insensitive multimode optical fiber structure, in which a bandwidth characteristic of an optical fiber is controlled from the perspective of impurity content change of a core layer; however, a middle cladding layer thereof is not doped with F, but is a Ge-doped glass material, and therefore, viscosity differences from the core layer to the inner cladding layer and to the trench cladding layer are large, and the design of functionally graded material is not used.

Therefore, a heretofore unaddressed need exists in the art to address the aforementioned deficiencies and inadequacies.

SUMMARY OF THE INVENTION

One of the objectives of the present invention is to solve a technical problems in the prior art, by providing a multimode optical fiber having reasonable material composition and structure design, and having advantages of bend-insensitive and high bandwidth.

In one aspect of the present invention, the multimode optical fiber includes a core layer and cladding layers surrounding the core layer.

The core layer has a parabolic refractive index profile with α being between 1.9 and 2.2, a radius R1 being between 23 μm and 27 μm, and a maximum relative refractive index difference $\Delta 1_{max}$ being between 0.9% and 1.2%.

The cladding layers comprise an inner cladding layer surrounding the core layer, a trench cladding layer surrounding the inner cladding layer and an outer cladding layer surrounding the trench cladding layer. The inner cladding layer has a width (R2−R1) being between 1 μm and 3 μm, and a relative refractive index difference Δ2 being between −0.05% and 0.1%. The trench cladding layer has a width (R3−R2) being between 2 μm and 5 μm, and a relative refractive index difference Δ3 being between −1% and −0.3%.

The core layer is a Ge/F co-doped silica glass layer, where an F doping contribution $\Delta F1_{min}$ at a central position of the core layer is less than or equal to 0%, an F doping contribution $\Delta F1_{max}$ at an edge portion of the core layer is greater than or equal to −0.45%. The outer cladding layer is a pure silica glass layer.

In one embodiment, the F doping contribution (an absolute value) is incrementing from the central position of the core layer to the edge portion of the core layer, and an increasing trend is linear or approximately parabolic.

In one embodiment, the inner cladding layer is a Ge/F co-doped silica glass layer, and an F doping contribution ΔF2 is greater than or equal to −0.45%.

In one embodiment, the trench cladding layer is a Ge/F co-doped silica glass layer or pure F doped silica glass layer, and an F doping contribution ΔF3 is between −1% and −0.3%.

In one embodiment, F doping contributions of the core layer and the cladding layer of the optical fiber meet $\Delta F1_{min} > \Delta F2 \geq \Delta F1_{max} > \Delta F3$.

In one embodiment, a DMD Inner Mask (5-18 μm) and a DMD Outer Mask (0-23 μm) of the optical fiber are both less than or equal to 0.33 ps/m; and a DMD Interval Mask is less than or equal to 0.25 ps/m; preferably, the DMD Inner Mask (5-18 μm) and the DMD Outer Mask (0-23 μm) of the optical fiber are both less than or equal to 0.14 ps/m. The DMD Interval Mask of the optical fiber is less than or equal to 0.11 ps/m.

In one embodiment, the optical fiber has a bandwidth of 1500 MHz-km or higher at a wavelength of 850 nm, and a bandwidth of 500 MHz-km or higher at a wavelength of 1300 nm.

Further, the optical fiber has a bandwidth of 3500 MHz-km or higher at a wavelength of 850 nm, and a bandwidth of 550 MHz-km or higher at a wavelength of 1300 nm.

More preferably, the optical fiber has a bandwidth of 5000 MHz-km or higher at a wavelength of 850 nm, and a bandwidth of 600 MHz-km or higher at a wavelength of 1300 nm.

In one embodiment, a numerical aperture of the optical fiber is between 0.185 and 0.215.

In one embodiment, a macro-bending induced loss caused by winding 2 rounds of the optical fiber in a bending radius of 7.5 mm at a wavelength of 850 nm is less than 0.2 dB; a macro-bending induced loss caused by winding 2 rounds of the optical fiber in a bending radius of 7.5 mm at a wavelength of 1300 nm is less than 0.5 dB.

In another aspect of the present invention, a manufacturing process of the multimode optical fiber includes the steps of mounting a pure quartz glass liner on a plasma enhanced chemical vapor deposition (PCVD) lathe; feeding a reactant gas to perform doped deposition; feeding a fluorine-containing gas in the reactant gas silicon tetrachloride ($SiCl_4$) and oxygen gas ($O_2$) to perform fluorine (F) doping, and feeding germanium tetrachloride ($GeCl_4$) to perform germanium (Ge) doping; the fluorine fluorine-containing gas being any one or more of $C_2F_6$, $CF_4$, $SiF_4$, $SF_6$, $C_4F_8$; ionizing the reactant gas in the liner by using microwave, so that the reactant gas becomes plasma and is finally deposited on an inner wall of the liner in a form of glass; according to doping requirements of a waveguide structure of the optical fiber, changing flux of the dopant gas in the mixed gas duly, so as to sequentially deposit the trench cladding layer, the inner cladding layer and the core layer; after the deposition is completed, collapsing the deposition tube into a solid core rod by using an electric heating furnace, preparing a preform with an RIT process by using pure quartz glass as a sleeve, or preparing a preform by preparing the outer cladding layer with an OVD, VAD or APVD clad deposition process; placing the preform on an optical fiber drawing tower to draw into an optical fiber, and coating UV-cured polyacrylic acid resin coating layers on inner and outer surfaces of the optical fiber.

Accordingly, beneficial effects of the present invention include, but are not limited to, (1) a multimode optical fiber having a functionally graded material composition and structure is designed, which solves the problems of the bend-insensitive multimode optical fiber such as distortion of an optical fiber core layer refractive index profile after fiber forming and DMD/bandwidth performance deterioration caused by a great difference of viscosity between the core layer and the trench cladding layer, so that the DMD of the optical fiber is effectively improved, and the bandwidth performance is greatly enhanced; (2) the core layer of the optical fiber is Ge/F co-doped, which is conducive to improving the material dispersion characteristic of the core layer material, and improving the bandwidth performance; (3) reasonable trench cladding layer parameter design improves the macro-bending performance of the optical fiber; (4) the manufacturing method of the present invention is simple and suitable for mass production; (5) the optical fiber of the present invention has advantages of bend-insensitive and high bandwidth, and can be widely applied to access networks and small optical devices.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "core rod" refers to a preform including a core layer and a part of cladding layers.

As used herein, the term "radius" refers to a distance between an outer boundary of the layer and a central point;

As used herein, the term "refractive index section" refers to the relationship between a refractive index of glass and a radius of an optical fiber or an optical fiber preform (including the core rod).

As used herein, the term "relative refractive index difference" is defined by $$\Delta = [(n_i^2 - n_0^2)/2n_i^2] \times 100\% \approx \frac{n_i - n_0}{n_0} \times 100\%,$$

where $n_i$ and $n_0$ are respectively a refractive index of each corresponding portion and a refractive index of pure silica quartz glass. Unless otherwise defined, $n_i$ refers to the maximal refractive index of each corresponding portion in the specification.

As used herein, the term "contribution of fluorine (F)" or "fluorine (F) contribution" refers to a relative refractive index difference ($\Delta$F) of fluorine (F) doped quartz glass relative to pure quartz glass, which is used to indicate the amount of doped fluorine (F).

As used herein, the term "contribution of germanium (Ge)" or "germanium (Ge) contribution" refers to a relative refractive index difference ($\Delta$Ge) of germanium (Ge) doped quartz glass relative to pure quartz glass, which is used to indicate the amount of doped germanium (Ge).

As used herein, the term "sleeve tube" refers to a thick-wall high-purity quartz glass tube that meets a certain sectional area requirement.

As used herein, the term "RIT process" refers to inserting a core rod in a sleeve tube to form an optical fiber preform.

As used herein, the term "exponential refractive index distribution profile" refers to a refractive index profile which satisfies the following exponential function, which in in the form of:

$$n^2(r) = n_1^2 \left[1 - 2\Delta\left(\frac{r}{a}\right)^\alpha\right] \quad r < a$$

where $n_1$ represents the refractive index at the axis of an optical fiber; r represents the distance away from the axis of the optical fiber; a represents the radius of the core layer of the optical fiber; $\alpha$ represents the distribution exponent; and $\Delta$ represents the relative refractive index difference of the core layer/a cladding layer.

The description will be made as to the embodiments of the present invention in conjunction with the accompanying drawings. In accordance with the purposes of this invention, as embodied and broadly described herein, this invention, in one aspect, relates to a bend insensitive multimode optical fiber.

According to the method of the present invention, a group of preforms is prepared and drawn into fibers, and double-layer coating of the multimode optical fiber is conducted. The structure and main performance parameters of the optical fiber are shown in Table 1.

In one embodiment, the optical fiber includes a core layer and cladding layers. The core layer refractive index profile is parabolic, where a is between 1.9 and 2.2. The core layer has a radius R1 and a maximum relative refractive index difference $\Delta 1_{max}$ being between 0.9% and 1.2%.

The cladding layer includes an inner cladding layer surrounding the core layer, a trench cladding layer surrounding the inner cladding layer and an outer cladding layer surrounding the trench cladding layer. The inner cladding layer has a radius R2 and a relative refractive index difference $\Delta 2$ being between −0.05% and 0.1%. The trench cladding layer has a radius R3 and a relative refractive index difference $\Delta 3$ being between −1% and −0.3%. The outer cladding layer is a pure silica glass layer, and the outer cladding layer has a radius R4 being between 60 μm and 65 μm.

In one embodiment, the macro-bending induced loss (i.e., added loss by bending) is measured according to the method specified in FOTP-62 (IEC-60793-1-47). A measured optical fiber is wound by one round (or coil, or loop) according to a certain diameter, such as: 10 mm, 15 mm, 20 mm, and 30 mm, the round is then released, and optical power changes before and after winding are measured to serve as the macro-bending induced loss of the optical fiber. During test, an encircled flux light injection condition is used. The encircled flux light injection condition may be obtained through the following manner: a common multimode optical fiber having a length being 2 m and a core diameter being 50 μm is welded to a front end of the measured optical fiber, a round having a diameter of 25 mm is wound in the middle of the optical fiber, and when full injection light is injected into the optical fiber, the measured optical fiber is the encircled flux light injection.

A full injection bandwidth is measured according to the FOTP-204 method, and the full injection condition is used during testing.

TABLE 1

Main Structural Performance Parameters of an Optical Fiber

| | 1 | 2 | 3 | 4 | 5 | 6 |
|---|---|---|---|---|---|---|
| Core layer α | 1.98 | 2.03 | 1.92 | 2.05 | 2.11 | 1.95 |
| Δ1max (%) | 1.08 | 1.12 | 1.2 | 0.91 | 1.18 | 0.97 |
| Δ2 (%) | 0.02 | 0.03 | 0.04 | −0.03 | 0 | 0.06 |
| Δ3 (%) | −0.35 | −0.48 | −0.53 | −0.43 | −0.66 | −0.72 |
| ΔF1max (%) | −0.21 | −0.16 | −0.42 | −0.45 | −0.36 | −0.33 |
| ΔF2 (%) | −0.21 | −0.29 | −0.16 | −0.35 | −0.36 | −0.28 |
| R1 (um) | 24.9 | 25.2 | 25.6 | 24.3 | 26.2 | 23.8 |
| R2 (um) | 25.9 | 26.8 | 27.2 | 26.5 | 27.5 | 26.8 |
| R3 (um) | 29.5 | 30.8 | 29.8 | 31.3 | 31.5 | 29.5 |

TABLE 1-continued

Main Structural Performance Parameters of an Optical Fiber

|  | 1 | 2 | 3 | 4 | 5 | 6 |
|---|---|---|---|---|---|---|
| Numerical aperture NA | 0.192 | 0.204 | 0.212 | 0.195 | 0.208 | 0.189 |
| DMD Inner Mask (ps/m) | 0.13 | 0.08 | 0.16 | 0.07 | 0.18 | 0.11 |
| DMD Outer Mask (ps/m) | 0.21 | 0.09 | 0.18 | 0.09 | 0.24 | 0.12 |
| DMD Interval Mask (ps/m) | 0.14 | 0.09 | 0.11 | 0.08 | 0.19 | 0.17 |
| Full injection bandwidth @850 nm (MHz-km) | 6230 | 4534 | 7262 | 3891 | 8185 | 2576 |
| Full injection bandwidth @1300 nm (MHz-km) | 762 | 656 | 682 | 639 | 716 | 815 |
| Macro-bending induced loss for 2 rounds in a bending radius of 7.5 mm @850 nm (dB) | 0.156 | 0.058 | 0.127 | 0.072 | 0.041 | 0.165 |
| Macro-bending induced loss for 2 rounds in a bending radius of 7.5 mm @1300 nm (dB) | 0.342 | 0.281 | 0.386 | 0.182 | 0.159 | 0.422 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A bend-insensitive multimode optical fiber, comprising:
a core layer; and
cladding layers surrounding the core layer,
wherein the core layer has a parabolic refractive index profile with α being between 1.9 and 2.2, a radius R1 being between 23 µm and 27 µm, and a maximum relative refractive index difference $\Delta 1_{max}$ being between 0.9% and 1.2%;
wherein the cladding layers comprise an inner cladding layer surrounding the core layer, a trench cladding layer surrounding the inner cladding layer and an outer cladding layer surrounding the trench cladding layer;
wherein the inner cladding layer has a width (R2−R1) being between 1 µm and 3 µm and a relative refractive index difference Δ2 being between −0.05% and 0.1%;
wherein the trench cladding layer has a width (R3−R2) being between 2 µm and 5 µm and a relative refractive index difference Δ3 being between −1% and −0.3%;
wherein the core layer is a Ge/F co-doped silica glass layer, wherein an F doping contribution $\Delta F1_{min}$ at a central position of the core layer is less than or equal to 0%, an F doping contribution $\Delta F1_{max}$ at an edge portion of the core layer is greater than or equal to −0.45%;
wherein the outer cladding layer is a pure silica glass layer; and
wherein the inner cladding layer is a Ge/F co-doped silica glass layer, and an F doping contribution ΔF2 is greater than or equal to −0.45%.

2. The bend-insensitive multimode optical fiber according to claim 1, wherein the F doping contribution is incrementing from the central position of the core layer to the edge portion of the core layer, and an increasing trend is linear or approximately parabolic.

3. The bend-insensitive multimode optical fiber according to claim 1, wherein the trench cladding layer is a Ge/F co-doped silica glass layer or pure F doped silica glass layer, and an F doping contribution ΔF3 is between −1% and −0.3%.

4. The bend-insensitive multimode optical fiber according to claim 3, wherein F doping contributions of the core layer and the cladding layer of the optical fiber meet $\Delta F1_{min} > \Delta F2 \geq \Delta F1_{max} > \Delta F3$.

5. The bend-insensitive multimode optical fiber according to claim 1, having a DMD Inner Mask (5-18 µm) and a DMD Outer Mask (0-23 µm) both being less than or equal to 0.33 ps/m; and a DMD Interval Mask being less than or equal to 0.25 ps/m.

6. The bend-insensitive multimode optical fiber according to claim 1, having a bandwidth of 3500 MHz-km or higher at a wavelength of 850 nm, and a bandwidth of 550 MHz-km or higher at a wavelength of 1300 nm.

7. The bend-insensitive multimode optical fiber according to claim 1, having a numerical aperture being between 0.185 and 0.215.

8. The bend-insensitive multimode optical fiber according to claim 1, wherein a macro-bending induced loss caused by winding 2 rounds of the optical fiber in a bending radius of 7.5 mm at a wavelength of 850 nm is less than 0.2 dB; a macro-bending induced loss caused by winding 2 rounds of the optical fiber in a bending radius of 7.5 mm at a wavelength of 1300 nm is less than 0.5 dB.

9. A bend-insensitive multimode optical fiber, comprising:
a core layer; and
cladding layers surrounding the core layer,
wherein the core layer has a parabolic refractive index profile with α being between 1.9 and 2.2, a radius R1 being between 23 µm and 27 µm, and a maximum relative refractive index difference $\Delta 1_{max}$ between 0.9% and 1.2%;
wherein the cladding layers comprise an inner cladding layer surrounding the core layer, a trench cladding layer surrounding the inner cladding layer and an outer cladding layer surrounding the trench cladding layer;
wherein the inner cladding layer has a width (R2−R1) being between 1 µm and 3 µm and a relative refractive index difference Δ2 being between −0.05% and 0.1%;
wherein the trench cladding layer has a width (R3−R2) being between 2 µm and 5 µm and a relative refractive index difference Δ3 being between −1% and −0.3%;

wherein the core layer is a Ge/F co-doped silica glass layer, wherein an F doping contribution $\Delta F1_{min}$ at a central position of the core layer is less than or equal to 0% an F doping contribution $\Delta F1_{max}$ at an edge portion of the core layer is greater than or equal to −0.45%;

wherein the F doping contribution is incrementing from the central position of the core layer to the edge portion of the core layer, and an increasing trend is linear or approximately parabolic;

wherein the outer cladding layer is a pure silica glass layer; and wherein the inner cladding layer is a Ge/F co-doped silica glass layer, and an F doping contribution $\Delta F2$ is greater than or equal to −0.45%.

10. The bend-insensitive multimode optical fiber according to claim 9, wherein the trench cladding layer is a Ge/F co-doped silica glass layer or pure F doped silica glass layer, and an F doping contribution $\Delta F3$ is between −1% and −0.3%.

11. The bend-insensitive multimode optical fiber according to claim 10, wherein F doping contributions of the core layer and the cladding layer of the optical fiber meet $\Delta F1_{min} > \Delta F2 \geq \Delta F1_{max} > \Delta F3$.

12. The bend-insensitive multimode optical fiber according to claim 9, having a DMD Inner Mask (5-18 μm) and a DMD Outer Mask (0-23 μm) both being less than or equal to 0.33 ps/m; and a DMD Interval Mask being less than or equal to 0.25 ps/m.

13. The bend-insensitive multimode optical fiber according to claim 9, having a bandwidth of 3500 MHz-km or higher at a wavelength of 850 nm, and a bandwidth of 550 MHz-km or higher at a wavelength of 1300 nm.

14. The bend-insensitive multimode optical fiber according to claim 9, having a numerical aperture being between 0.185 and 0.215.

15. The bend-insensitive multimode optical fiber according to claim 9, wherein a macro-bending induced loss caused by winding 2 rounds of the optical fiber in a bending radius of 7.5 mm at a wavelength of 850 nm is less than 0.2 dB; a macro-bending induced loss caused by winding 2 rounds of the optical fiber in a bending radius of 7.5 mm at a wavelength of 1300 nm is less than 0.5 dB.

* * * * *